Sept. 8, 1959 O. HOHNECKER 2,903,266

DYNAMIC DISK-POSITIONING APPARATUS

Filed Nov. 2, 1956

*INVENTOR.*
OTTO HOHNECKER

BY [signature]

AGENT

United States Patent Office 2,903,266

Patented Sept. 8, 1959

2,903,266

DYNAMIC DISK-POSITIONING APPARATUS

Otto Hohnecker, Stamford, Conn., assignor to Burroughs Corporation, a corporation of Michigan Application November 2, 1956, Serial No. 620,120

11 Claims. (Cl. 274—39)

The present invention relates to turntable assemblies and more particularly to a combination of turntable and magnetic memory disk.

While of broader applicability, turntable assemblies in accordance with the present invention are particularly useful in computing apparatus utilizing replaceable magnetic memory disks for storing data. A problem in such apparatus has been maintaining accurate registration between the magnetic tracks in which information is stored on the memory disks and the magnetic heads used to record read-out data.

An important object of the invention is to provide a novel turntable assembly wherein a disk as a part thereof is self-centering.

Another important object of the invention is to provide an improved turntable and magnetic memory disk assembly wherein means operate to enable quick and accurate centering of such disk with the information tracks thereon in accurate registry with juxtaposed magnetic heads.

A further object is to provide means responsive to centrifugal forces created by the rotation of the turntable to maintain a memory disk accurately centered.

A still further object is to provide means for maintaining a turntable in dynamic balance to compensate for disk response to centrifugal action while the turntable is rotating.

Still more specifically it is an object of the invention to provide such construction well adapted for mass production.

Figure 1:
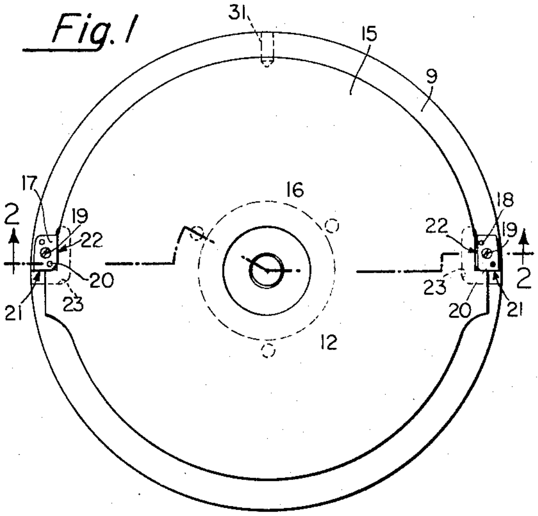
Fig. 1 is a plan view of a turntable assembly showing a memory disk in operative position.
Figure 3:
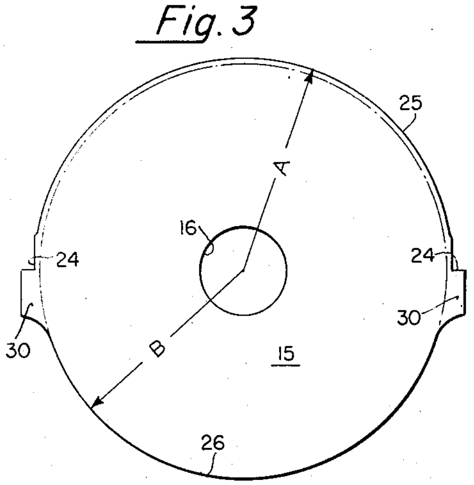
Fig. 3 is a plan view of a memory disk in accordance with the present invention.
Figure 2:
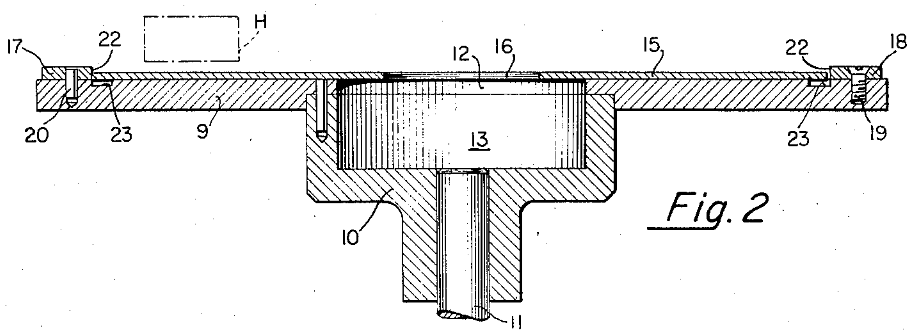
Fig. 2 is a section view on line 2—2 of Fig. 1.

Referring to the drawings illustrating a preferred embodiment of the invention and initially to Figs. 1 to 3, a turntable 9 is shown coaxially fixed to a hub 10 which is keyed or otherwise secured to a shaft 11 to be driven from a source of power not shown. In one form of the invention turntable 9 has a centrally located aperture 12 opening into a circular recess or socket 13 in the hub 10 in which, and for the reason more fully described later, may be mounted a plurality of projectable latch fingers 14 (Fig. 4) for locking a superposed disk 15 in place on the turntable. This latch finger assembly is not shown in detail because it is fully described and claimed in my copending application entitled "Centering and Clamping Arrangement," Serial No. 587,989, filed May 29, 1956, and assigned to the assignee of the present invention. Sufficient to say here is that disk 15 has a center hole 16 of less diameter than aperture 12 of the turntable but axially aligned therewith when the disk is properly seated upon the turntable. This center hole 16 serves to permit the radially disposed latches 14 in the socket 13 to pass through and overlie the rim of the hole to lock the disk as fully described in the aforesaid copending application. The latches 14 are carried by a reciprocable head which rises to pass the latches through the disk hole 16 in retracted condition after which a camming unit spreads the latches to overlie the rim of the hole to clamp the disk to the turntable 9.

In order that disk 15 can be accurately centered upon the turntable 9, that is with its hole 16 in coaxial registration with aperture 12, two stop members 17 and 18 are fixed, as by screws 19 and dowels 20, to the upper face of the turntable at substantially diametrically opposite sides thereof. As here shown each stop has two sides meeting at right angles and forming two straight edges 21 and 22, the former of which preferably is coincident with a diameter of the turntable. Thus, the two edges 21 lie in a common diametrical plane providing limit stop means for a disk 15 slid into position beneath magnetic heads, only one of which is diagrammatically illustrated and designated by the letter H. Also it is preferable to chamfer the corner formed by the meeting edges of the stops. Further attention is directed to two grooves 23 in the turntable, each bounding and conforming to the edges 21 and 22 at one side of the table, but with one leg of each terminating at the rim of the turntable as discharge outlets. These grooves 23 function as collectors and dischargers for dirt or dust pushed ahead of a disk 15 being slid into place.

For stopping the disk 15 in registered position upon turntable 9 two angular seats 24 (Fig. 3) are formed at substantially diametrically opposite sides of the disk, and each is dimensioned and shaped to conform to the contour of a stop member. Thus, like stops 17 and 18 the mating seats have two aligned straight edges coincident with a disk diameter and two straight edges normal to that diameter. When the disk is slid into position on the turntable the two seats snugly abut the stops 17 and 18 for true axial registration between the turntable aperture and the disk hole.

As a means to maintain the disk precisely registered during rotation of the turntable, one portion of the disk is deliberately made to be out of balance with the diametrically opposite portion. While this condition may be accomplished in other ways, preferably one portion of the disk is bounded by an arc 25 generated about the disk center on a radius "A" while the other portion of the disk is bounded by an arc 26 also generated about the disk center on a different radius "B." For the centrifugal action required to maintain the disk in contact with the positioning stops, that portion of the disk bounded by arc 25 which is to extend inwardly of the turntable beyond the stops 17 and 18, is of greater mass than the other disk portion, thus to maintain a constant thrust of the disk, toward and against the stops 17 and 18.

Preferably this increase of differential disk mass is made by generating the arc 25 on a longer radius "A" than the radius "B" of the arc 26. With a disk diameter of substantially ten inches it has been found that a radii difference of approximately two thousandths of an inch is adequate. Thus, with a disk 15 slid into operative superposed position on the turntable 10 and the latter brought up to a relatively high speed, the developed centrifugal force creates the required radial thrust to hold the disk 15 pressed firmly against the stops 17 and 18.

The importance of this advanced construction will be appreciated when it is understood that the stored magnetic information on the disk is in the form of discrete elements, each along one of a series of concentric circles or tracks, which are respectively arranged to pass beneath the magnetic heads H, operatively located in juxtaposed relation to the disk. Since the discrete elements of such memory disks are stored in closely spaced relation in the order of thousandths of an inch, it is obvious that precision matching of a disk with the heads is of utmost importance because any variation in the position of the disk will render the read-out either inaccurate or distorted. By the present invention constant precision matching is assured at all turntable speeds.

In connection with this different radius shaping of disk 15, it should be noted that substantially diametrically disposed ears 30 are formed between the opposite adjacent ends of the two arcs 25 and 26, and in which the seats 24 are formed, it being understood, of course, that the mass on the "A" side of the disk also compensates for the weight that ears 30 add to the "B" side of the disk.

In order to maintain the dynamic balance of the rotating assembly a portion of the material is removed from the side of the turntable below the heavy side of the disk 15, the removed portion being of equal weight to that added to the heavy side of the disk. In the preferred form, this compensating means is accomplished by boring a hole 31 radially into the rim of the turntable medially between the locations of the two stops 17 and 18 to take out the required material. It will be understood that other balancing means can be employed and the present bored hole is not to be considered a limitation of the invention. Also it is to be understood that the mass difference can be obtained other than by the arc construction which here substantially forms two half disk areas.

From the foregoing it will be seen that the disk positioning control of the present invention makes possible the rapid interchange of disks without disturbing the matching relationship of the magnetic tracks on the disks with the juxtaposed magnetic heads. With the present novel assembly, it is now possible to stop the turntable, quickly slide the disk therefrom, replace it with another disk and resume operation in a matter of seconds with assurance that each disk is accurately centered for precise track registration.

Figure 4:
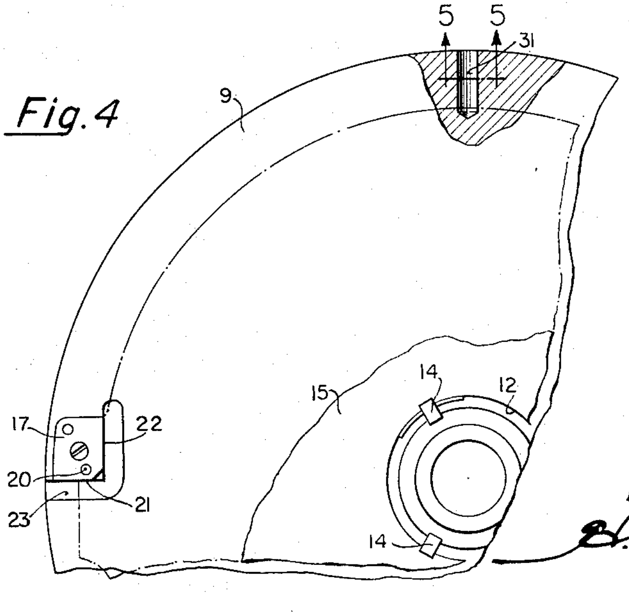
Fig. 4 is a fragmentary plan view, partly broken away, of the turntable on an enlarged scale and showing disk latch means.
Figure 5:
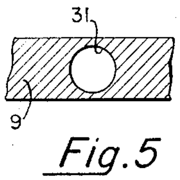
Fig. 5 is a section view on line 5—5 of Fig. 4.

When used with latch means such as indicated at 14 in Fig. 4, the invention acts as a safeguard to hold the disk in position should the turntable be rotated without the latch in operative latching engagement with the disk. In this regard and in accordance with the above identified co-pending application, it will be noted that a slight clearance has been illustrated between stop 18 and right hand disk seat 24. It should be understood however that in the present invention without using latch elements 14 this clearance need not be provided. In fact stop elements 17 and 18 may, if desired, be shaped otherwise than shown.

It will now be apparent that a complete unitary turntable and magnetic memory disk assembly has been devised wherein unbalanced disk areas function in conjunction with position locating means on a turntable, during rotation of the latter, to maintain a disk precisely centered on the turntable. Furthermore, as a component of the invention means are provided to compensate for such disk unbalance and so maintain the dynamic balance of the assembly.

What is claimed is:

1. A turntable assembly rotatable about an axis and comprising the combination of a turntable, a disk on said turntable in superposed relation, peripherally located stop means on said turntable and said disk cooperating to position said disk centered on said turntable, and means responsive to the rotational speed of said turntable for holding said disk abutting said stop means by the centrifugal force resulting from the rotation of said assembly.

2. A turntable assembly according to claim 1 wherein said responsive means is a difference in the mass of one portion of the disk with respect to another portion.

3. A turntable assembly according to claim 1 wherein said responsive means includes one part of the disk generated on a radius different from another part, whereby said one part is of greater mass than the other.

4. A turntable assembly according to claim 2 and wherein the mass of said turntable is such as to balance said assembly dynamically to compensate for the imbalance of said disk.

5. A turntable assembly comprising, a turntable having a hub with a central aperture, a disk positioned on said turntable and provided with a central aperture for registration with said hub aperture, said disk being of greater mass on one peripheral area than others, stop means on said turntable for positioning said disk in a central position thereon whereby rotation of said turntable causes centrifugal force to urge said disk against said stop means, and means within said hub aperture rim cooperating with said disk aperture on latch said disk on said turntable.

6. A construction according to claim 5 wherein said disk includes projections on diametrically opposite sides of said disk engageable with said stop means.

7. A turntable assembly comprising the combination of a turntable having two coplanar areas of different weight, a disk having two coplanar areas of different weight and arranged to be placed on said turntable with its heavier area above the lighter area of said turntable to equalize the weight of the two coplanar areas and maintain said assembly in dynamic balance while rotating, and stop means centering said disk on said turntable and preventing relative movement thereof while said turntable rotates whereby centrifugal force urges said disk against said stop means.

8. A recording disk comprising oppositely positioned coplanar areas of different mass, and oppositely positioned abutments extending radially from the periphery of said disk at points on a line substantially intermediate said areas.

9. A disk construction according to claim 8 wherein one of said areas is generated by a different radius than the other of said areas.

10. A turntable assembly comprising a turntable having a top planar face stops at opposite sides of the turntable rim respectively forming the only projections above said face, a disk for sliding laterally across said face for superposed axial registration with said face, seats formed on opposite sides of the rim of said disk for respectively engaging said stops to limit the sliding of the disk to its axially registered position, and an arcuate area at one side of a line between said seats of greater mass than the other side whereby the centrifugal force generated by turntable rotation maintains said seats in contact with said stops.

11. A turntable assembly according to claim 10 wherein said turntable has a greater mass on the side beneath the lighter side of said disk thus to equalize the mass difference of said disk to maintain the turntable balance.

References Cited in the file of this patent

UNITED STATES PATENTS

| | | |
|---|---|---|
| 1,530,142 | Smith | Apr. 6, 1922 |
| 2,518,232 | Giovannucci et al. | Aug. 8, 1950 |

UNITED STATES PATENT OFFICE

CERTIFICATE OF CORRECTION

Patent No. 2,903,266 September 8, 1959

Otto Hohnecker

It is hereby certified that error appears in the printed specification of the above numbered patent requiring correction and that the said Letters Patent should read as corrected below.

Column 4, line 25, claim 5, for "aperture on" read -- aperture to --.

Signed and sealed this 1st day of March 1960.

(SEAL)

Attest:

KARL H. AXLINE
Attesting Officer

ROBERT C. WATSON
Commissioner of Patents